(12) United States Patent (10) Patent No.: US 9,905,010 B2
Gouda et al. (45) Date of Patent: Feb. 27, 2018

(54) IMAGE POSITION DETERMINATION DEVICE AND IMAGE POSITION DETERMINATION METHOD FOR REDUCING AN IMAGE OF A CLOSED EYE PERSON

(71) Applicant: PANASONIC INTELLECTUAL PROPERTY MANAGEMENT CO., LTD., Osaka (JP)

(72) Inventors: Youichi Gouda, Ishikawa (JP); Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/898,871

(22) PCT Filed: Jun. 17, 2014

(86) PCT No.: PCT/JP2014/003255
§ 371 (c)(1),
(2) Date: Dec. 16, 2015

(87) PCT Pub. No.: WO2014/203523
PCT Pub. Date: Dec. 24, 2014

(65) Prior Publication Data
US 2016/0133021 A1 May 12, 2016

(30) Foreign Application Priority Data
Jun. 18, 2013 (JP) .................................. 2013-127594

(51) Int. Cl.
*G06K 9/00* (2006.01)
*G06T 7/00* (2017.01)
(Continued)

(52) U.S. Cl.
CPC ........ *G06T 7/0042* (2013.01); *G06K 9/00221* (2013.01); *G06K 9/00228* (2013.01);
(Continued)

(58) Field of Classification Search
None
See application file for complete search history.

(56) References Cited

U.S. PATENT DOCUMENTS 7,822,241 B2 * 10/2010 Eck .......................... A61B 6/12
382/128
8,031,970 B2 * 10/2011 Li ...................... G06K 9/00597
382/173
(Continued)

FOREIGN PATENT DOCUMENTS

EP 2339506 6/2011
JP 2004-178229 6/2004
(Continued)

OTHER PUBLICATIONS

Extended European Search Report in European Patent Application No. 14813989.2, dated Mar. 15, 2017.
(Continued)

*Primary Examiner* — Tahmina Ansari
(74) *Attorney, Agent, or Firm* — Greenblum & Bernstein, P.L.C.

(57) ABSTRACT

An imaging position determination device includes an image reception unit that acquires an image and a position of a person within a monitoring area, an eye state detection unit that detects an open and closed state of eyes of a person from the image acquired by the image reception unit, an eye state map creation unit that creates an eye state map which shows an eye state of the person in the monitoring area based on the open and closed state of eyes of the person that is acquired by the eye state detection unit, and an adjustment amount
(Continued)

estimation unit that determines an imaging position of the person in the monitoring area based on the eye state map that is created by the eye state map creation unit.

16 Claims, 15 Drawing Sheets

(51) Int. Cl.
    *H04N 5/232*     (2006.01)
    *G06K 9/20*     (2006.01)
    *G06T 7/73*     (2017.01)
    *H04N 21/442*     (2011.01)
    *G08B 13/196*     (2006.01)

(52) U.S. Cl.
    CPC ..... *G06K 9/00604* (2013.01); *G06K 9/00771* (2013.01); *G06K 9/2027* (2013.01); *G06T 7/73* (2017.01); *H04N 5/23219* (2013.01); *G06K 9/00597* (2013.01); *G08B 13/19613* (2013.01); *H04N 21/44218* (2013.01)

(56) References Cited

U.S. PATENT DOCUMENTS

| | | | |
|---|---|---|---|
| 8,379,923 B2* | 2/2013 | Ishikawa | G01C 21/32 382/104 |
| 2003/0058111 A1 | 3/2003 | Lee et al. | |
| 2003/0058237 A1 | 3/2003 | Lee | |
| 2003/0058339 A1 | 3/2003 | Trajkovic et al. | |
| 2003/0058340 A1 | 3/2003 | Lin et al. | |
| 2003/0058341 A1 | 3/2003 | Brodsky et al. | |
| 2003/0058342 A1 | 3/2003 | Trajkovic | |
| 2003/0059081 A1 | 3/2003 | Trajkovic | |
| 2003/0059106 A1 | 3/2003 | Gutta | |
| 2006/0171453 A1 | 8/2006 | Rohlfing et al. | |
| 2006/0255931 A1 | 11/2006 | Hartsfield et al. | |
| 2006/0290780 A1 | 12/2006 | Porikli | |
| 2008/0100704 A1* | 5/2008 | Venetianer | G06F 17/3079 348/143 |
| 2009/0060383 A1* | 3/2009 | Li | G06K 9/00597 382/282 |
| 2009/0086022 A1 | 4/2009 | Finn et al. | |
| 2011/0158482 A1* | 6/2011 | Johnson | G06K 9/00771 382/107 |
| 2012/0044348 A1 | 2/2012 | Pijl et al. | |
| 2016/0133021 A1* | 5/2016 | Gouda | H04N 5/23219 382/103 |
| 2016/0155003 A1 | 6/2016 | Venetianer et al. | |
| 2016/0275766 A1 | 9/2016 | Venetianer et al. | |

FOREIGN PATENT DOCUMENTS

| | | |
|---|---|---|
| JP | 2005-505209 | 2/2005 |
| JP | 2008-009689 | 1/2008 |
| JP | 2009-086932 | 4/2009 |
| JP | 2011-114580 | 6/2011 |
| JP | 2012-525755 | 10/2012 |
| WO | 2006/074328 | 7/2006 |
| WO | 2006/118563 | 11/2006 |

OTHER PUBLICATIONS

International Search Report in International Patent Application No. PCT/JP2014/003255, dated Sep. 2, 2014.
Partial Supplementary European Search Report, issued in European Patent Application No. 14813989.2, dated Nov. 7, 2016.

* cited by examiner

IMAGE POSITION DETERMINATION DEVICE AND IMAGE POSITION DETERMINATION METHOD FOR REDUCING AN IMAGE OF A CLOSED EYE PERSON

TECHNICAL FIELD

The present disclosure relates to an imaging position determination device and an imaging position determination method that are suitable for use in a monitoring camera system.

BACKGROUND ART

In monitoring camera systems, there are systems that have an image processing device that extracts a facial image of a collation target person from a captured image. For example, there is an image processing device that is disclosed in PTL 1. This image processing device is configured to extract a facial image of a collation target person from an image that is captured using an imaging means, and to perform adjustment of an imaging direction, adjustment of a zoom ratio, and adjustment of an exposure amount of the imaging means based on the facial image in case that the facial image of the collation target person is not suitable for collation with a stored facial image of a stored person.

CITATION LIST

Patent Literature

[PTL 1] JP-A-2009-086932

SUMMARY OF INVENTION

Technical Problem

However, in case that it is determined that the facial image of the collation target person is not suitable for collation, the abovementioned image processing device that is disclosed in PTL 1 performs adjustment of the imaging direction, the zoom ratio, and the exposure amount of the imaging means, but the device cannot perform adjustment according to circumstances. In addition, it is not possible to determine that faces with closed eyes and faces that are not facing forward are not suitable for facial collation. Specifically, changes in illumination conditions are one of main causes of changes in an eye state and a facial orientation of a collation target person. Illumination conditions that are due to sunlight change with time, and it is necessary to change the adjustment of the camera in response to the changes, but in the image processing device that is disclosed in PTL 1, it is not possible to suitably estimate the amount of the changes. In addition, it is not possible to determine that faces with closed eyes are not suitable for collation.

The present disclosure is made in view of the abovementioned circumstances, and an object thereof is to provide an imaging position determination device and an imaging position determination method which perform an image process that performs facial collation using a captured image, in which the imaging position determination device and the imaging position determination method are capable of performing camera adjustment according to circumstances, and are capable of reducing an acquisition of faces with closed eyes.

Solution to Problem

An imaging position determination device of the present disclosure includes an input unit that acquires an image and a position of a person within a monitoring area, a state extraction unit that extracts a state of the person from the image acquired by the input unit, a state map creation unit that creates a state map which shows a state of the person in the monitoring area using the position of the person and the state of the person, and a position determination unit that determines an imaging position of the person in the monitoring area using the state map.

Advantageous Effects of Invention

According to the present disclosure, it is possible to perform camera adjustment according to circumstances, and it is possible to reduce the acquisition of face images with closed eyes, and therefore, an improvement in the precision of facial collation is achieved.

DESCRIPTION OF EMBODIMENTS

Hereinafter, preferred embodiments for implementing the present disclosure will be described in detail with reference to the drawings.

Figure 1:
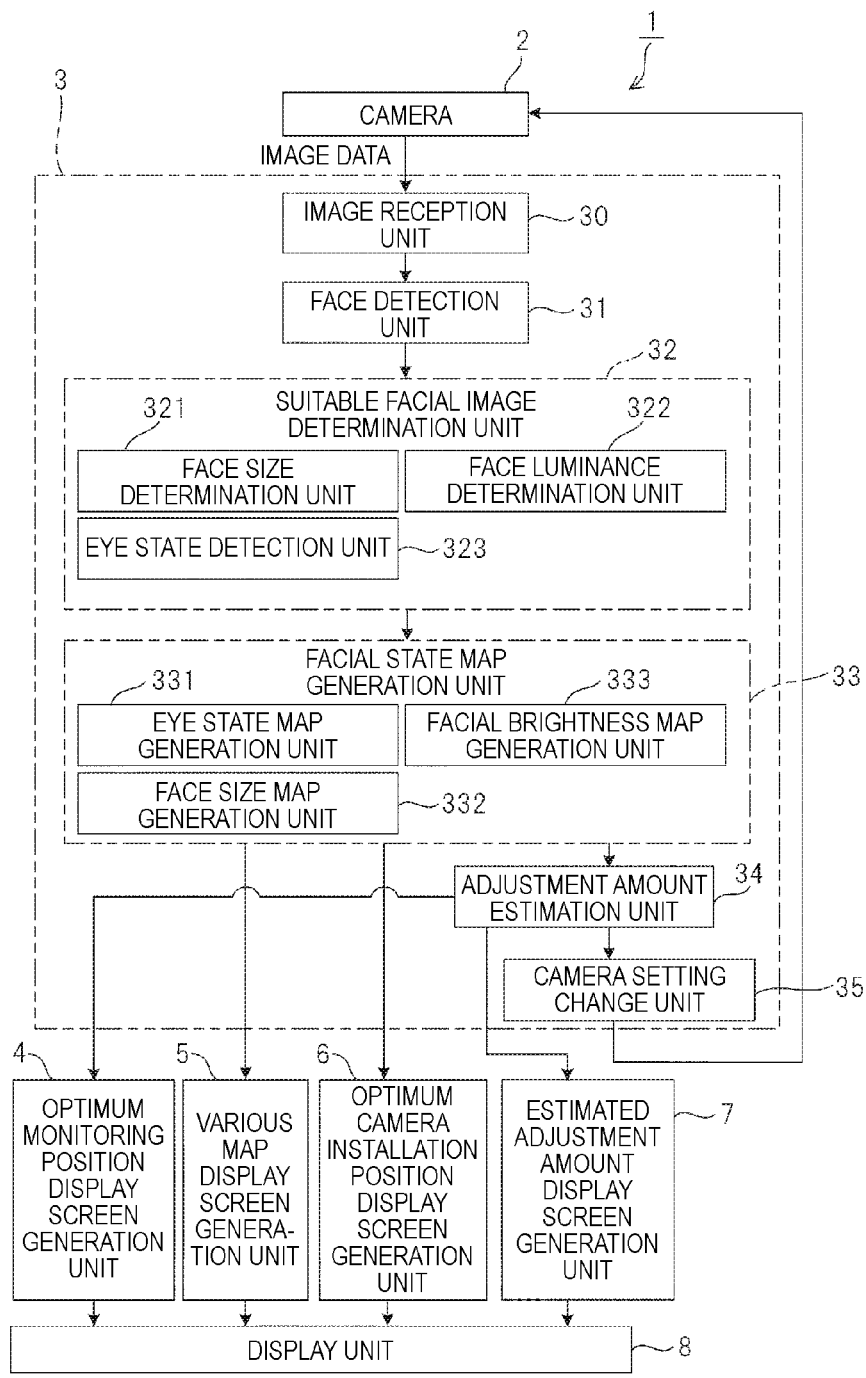
FIG. 1 is a block diagram that shows a schematic configuration of an imaging position determination device according to an embodiment of the present disclosure.

FIG. 1 is a block diagram that shows a schematic configuration of an imaging position determination device according to an embodiment of the present disclosure. In the figure, an imaging position determination device 1 according to the present embodiment includes a camera (an imaging unit) 2, an image processing device 3, an optimum monitoring position display screen generation unit 4, a various map display screen generation unit 5, an optimum camera installation position display screen generation unit 6, an estimated adjustment amount display screen generation unit 7, and a display unit 8.

The camera 2 acquires a monitoring image by capturing an image of a monitoring area, and outputs the monitoring image as image data. The image processing device 3 includes an image reception unit (an input unit) 30, a face detection unit 31, a suitable facial image determination unit 32, a facial state map generation unit 33, an adjustment amount estimation unit (a position determination unit) 34, and a camera setting change unit 35. The image reception unit 30 acquires an image of a person in a monitoring area from image data that is output from the camera 2. The face detection unit 31 performs a face detection process of detecting a face of a person from the image that the image reception unit 30 acquires. The suitable facial image determination unit 32 includes a face size determination unit 321 which determines a size of the face of the person that is detected by the face detection unit 31 a facial luminance determination unit 322 which determines a luminance of the face of the person that is detected by the face detection unit 31, and an eye state detection unit (a state extraction unit) 323 which detects an open and closed state of eyes of the person that is detected by the face detection unit 31.

The facial state map generation unit 33 includes an eye state map generation unit (a state map creation unit) 331 which creates an eye state map that shows an open and closed state of eyes of a person in the monitoring area from the position of the person and the state of the person, a face size map generation unit 332 which generates a face size map from the face size of the person and a facial brightness map generation unit 333 which generates a facial brightness map from the facial luminance of the person. The facial state map generation unit 33 respectively outputs the generated eye state map, face size map and facial brightness map to the various map display screen generation unit 5 and the optimum camera installation position display screen generation unit 6.

The adjustment amount estimation unit 34 determines an optimum monitoring position of a person in the monitoring area using various maps that are generated by the facial state map generation unit 33, and the determined optimum monitoring position is output to the optimum monitoring position display screen generation unit 4. In addition, the adjustment amount estimation unit 34 estimates an adjustment amount (an imaging direction, a zoom ratio, an exposure amount and the like) of the camera 2 with respect to the determined optimum monitoring position, and outputs the estimated adjustment amount to the camera setting change unit 35. The camera setting change unit 35 changes the camera setting using the adjustment amount that is estimated by the adjustment amount estimation unit 34.

The optimum monitoring position display screen generation unit 4 generates display information for visually displaying the optimum monitoring position that is determined by the adjustment amount estimation unit 34 in a three-dimensional manner which is optimum in setting of the camera 2. The various map display screen generation unit 5 generates display information for displaying various maps that are generated by the facial state map generation unit 33 in a visual manner. The optimum camera installation position display screen generation unit 6 analyzes states of the various maps that are generated by the facial state map generation unit 33, and generates display information which suggests a position for installation of the camera 2 in which optimum monitoring is possible. The estimated adjustment amount display screen generation unit 7 generates display information for displaying the adjustment amount that is estimated by the adjustment amount estimation unit 34 in a visual manner. The display unit 8 visually displays respective display information that is output from the optimum monitoring position display screen generation unit 4, display information that is output from the various map display screen generation unit 5, display information that is output from the optimum camera installation position display screen generation unit 6, and display information that is output from the estimated adjustment amount display screen generation unit 7.

Next, operation of the imaging position determination device 1 according to the present embodiment will be described.

Figure 2:
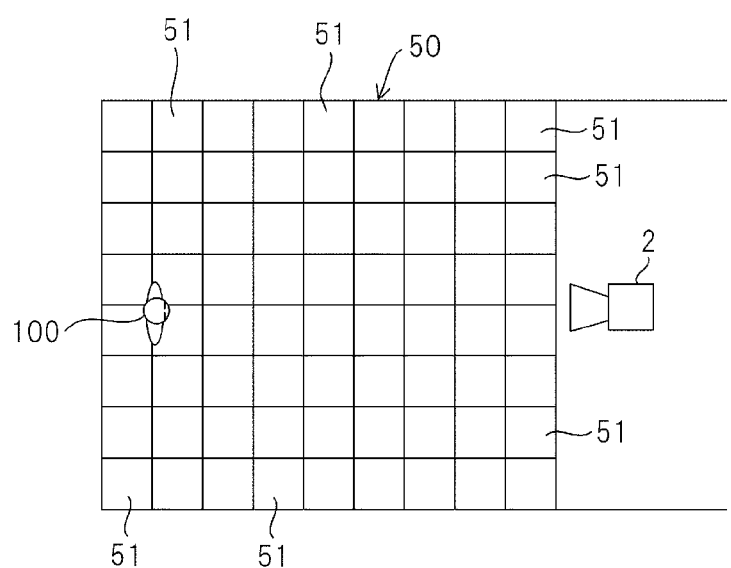
FIG. 2 is a view in which a monitoring area of the imaging position determination device in FIG. 1 is seen from directly above.
Figure 3:
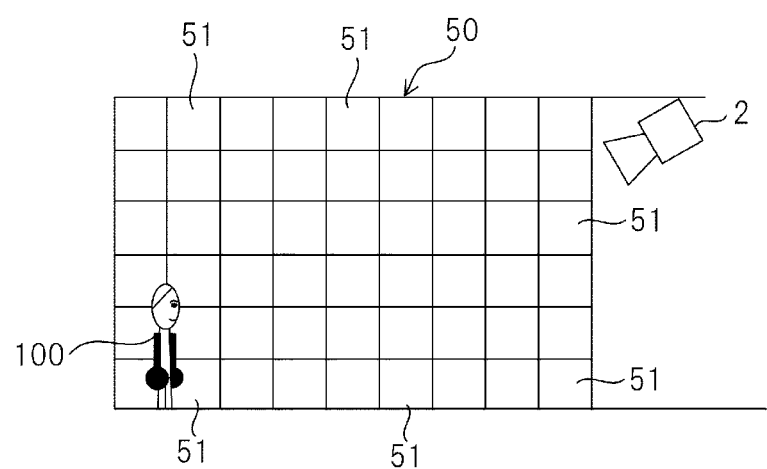
FIG. 3 is a view in which the monitoring area of the imaging position determination device in FIG. 1 is seen from the side.

FIGS. 2 and 3 are views that show a monitoring area 50 of the camera 2, FIG. 2 is a view in which the monitoring area 50 is seen from directly above, and FIG. 3 is a view in which the same area 50 is seen from the side. The camera 2 is disposed in the vicinity of an entrance of a store, and captures an image of a person 100 that comes out of the store. In the monitoring area 50, an area between a far end and a near end is partitioned at regular intervals, and each partition is referred to as a cell 51.

Figure 4:
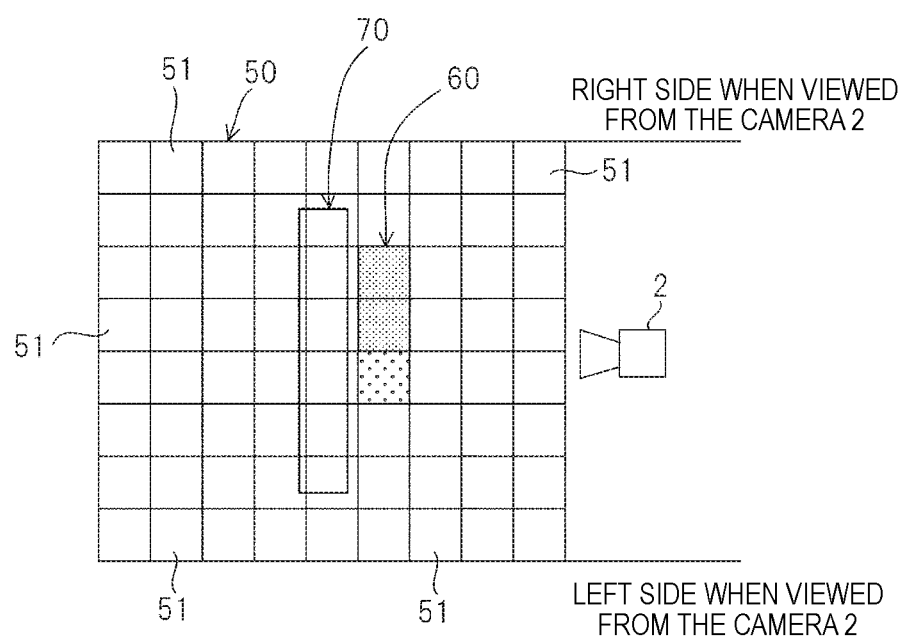
FIG. 4 is an example of an eye state map that is generated by an eye state map generation unit in the imaging position determination device in FIG. 1, and is a view from directly above.
Figure 5:
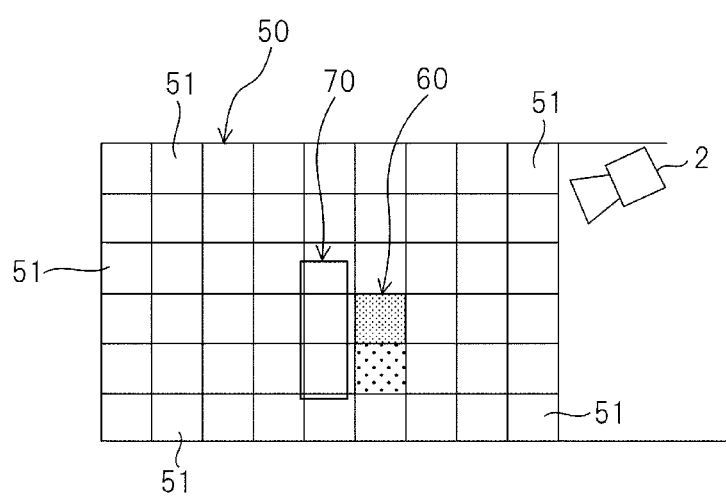
FIG. 5 is an example of the eye state map that is generated by the eye state map generation unit in the imaging position determination device in FIG. 1, and is a view from the side.
Figure 6:
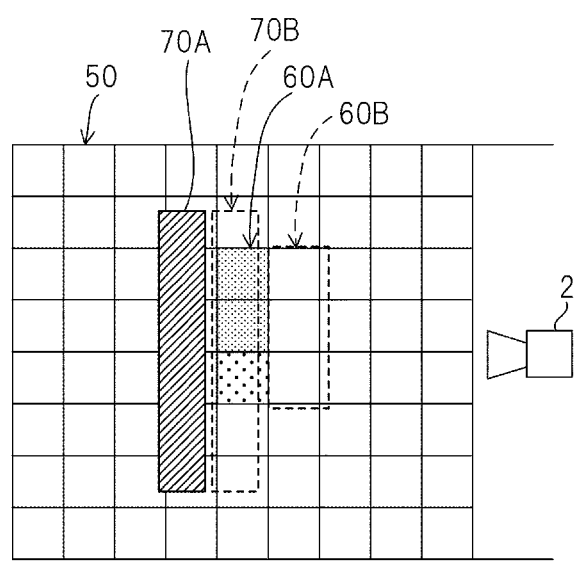
FIG. 6 is an example of the eye state map that is generated by the eye state map generation unit in the imaging position determination device in FIG. 1, and is a view from directly above.
Figure 7:
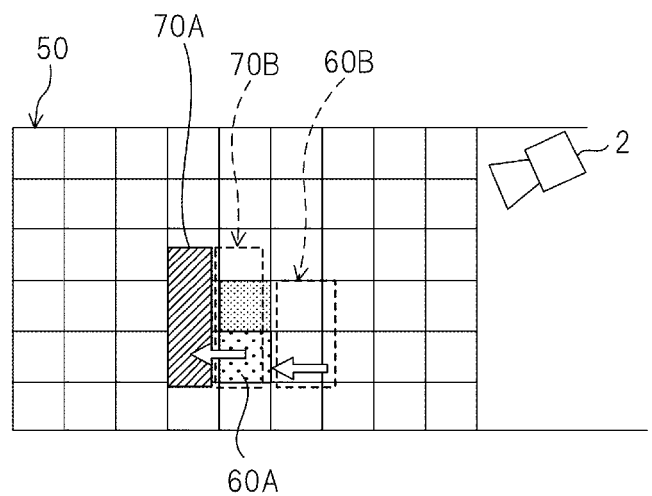
FIG. 7 is an example of the eye state map that is generated by the eye state map generation unit in the imaging position determination device in FIG. 1, and is a view from the side.

FIGS. 4 to 7 show examples of eye state maps that are generated by the eye state map generation unit 331, FIGS. 4 and 6 are respectively views in which eye state maps are seen from directly above, and FIGS. 5 and 7 are respectively views in which eye state maps are seen from the side. In FIGS. 4 and 5, the eye state maps show states of eyes of people in a certain period of time, and the darker the cell is, the more images with a closed eye state there are. In the period of time at which the eye state maps that are shown in FIGS. 4 and 5 are obtained, a large amount of facial images with a closed eye state are observed in the cells 51 of the fourth row from the camera 2 side. In this case, there are cases in which there is one cell 51 in which a large amount of facial images with a closed eye state are observed, but there are also cases in which there are a plurality of such cells. In the examples that are shown in FIGS. 4 and 5, there are a plurality of cells 51 in which a large amount of facial images with a closed eye state are observed, and an area that corresponds to the plurality of cells 51 is referred to as a deterioration area 60.

In the deterioration area 60, a large amount of facial images with a closed eye state are observed, and the precision of facial collation is reduced. In such an instance, the imaging direction, the zoom ratio, the exposure amount and the like of the camera 2 are adjusted so that it is possible to acquire an optimum facial image without a closed eye state. For example, when the adjustment of the camera 2 is performed so that it is possible to acquire an optimum facial image (a facial image without a closed eye state) in an area (an optimum monitoring area) 70 that corresponds to the cells 51 of the fifth row from the camera 2 side, facial collation with high precision is performed.

However, when the time has passed and the state that is shown in FIGS. 6 and 7 is reached, a large amount of facial images with a closed eye state are observed in the area 70. That is, when the deterioration area 60 moves and reaches the area 70, a large amount of facial images with a closed eye state are observed. In this case, as shown in FIGS. 6 and 7, a previous deterioration area is represented by 60B (B: Before), and a current deterioration area is represented by 60A (A: After). The imaging position determination device 1 according to the present embodiment is configured so as to generate a plurality of eye state maps in a predetermined period of time, and to change the imaging position of a person in the monitoring area 50 in accordance with a movement direction in the monitoring area 50 of the eye state maps. Additionally, in FIGS. 6 and 7, the previous area (the optimum monitoring area) is represented by 70B (B: Before), and the current area (the optimum monitoring area) is represented by 70A (A: After).

In this manner, the imaging position determination device 1 according to the present embodiment is configured to change the imaging position of a person in the monitoring area 50 so that a large amount of facial images with a closed eye state are not observed. Hereinafter, the operations of each unit will be described. Firstly, the eye state map generation unit 331 calculates a score which shows a closed eye state for each cell 51 of the monitoring area 50 and generates an eye state map by multiplying the scores for each cell. Such an eye state map is created multiple times in a predetermined period of time, and the adjustment amount estimation unit 34 determines the imaging position (hereinafter, referred to as the optimum monitoring position) of the person in the monitoring area 50 each time an eye state map is generated based on the generated eye state map. Then, the determined optimum monitoring position is output to the optimum monitoring position display screen generation unit 4. In addition, the adjustment amount estimation unit 34 estimates the amount of adjustment (the imaging direction, the zoom ratio, the exposure amount and the like) of the camera 2 for the determined optimum monitoring position, and outputs the estimated adjustment amount to the camera setting change unit 35.

Figure 8:
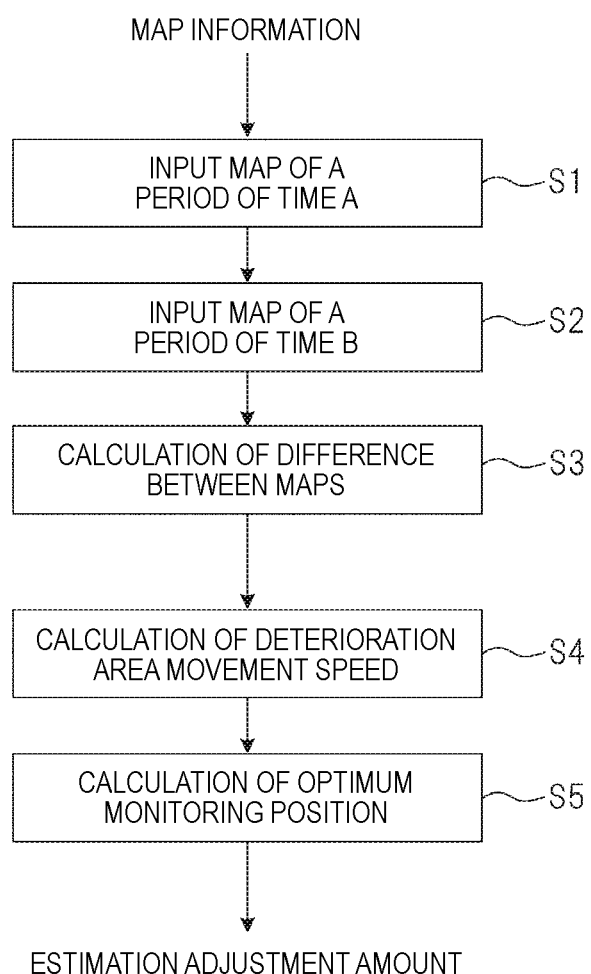
FIG. 8 is a flowchart that shows a process of an adjustment amount estimation unit in the imaging position determination device in FIG. 1.

FIG. 8 is a flowchart that shows a process of the adjustment amount estimation unit 34. In the figure, firstly, an eye state map of a period of time A is input (Step S1). Next, an eye state map of a period of time B is input (Step S2). After the eye state map of the period of time A and the eye state map of the period of time B are input, a difference between these two eye state maps is calculated (Step S3). Then, a movement speed of a deterioration area (that is, a closed eye area) is calculated using the calculated difference (Step S4). After the movement speed of the deterioration area is calculated, the optimum monitoring position is calculated (Step S5).

Additionally, it is possible to perform the same process for face size and facial brightness. In the same manner as that of eye state, for facial brightness, it is possible to utilize the fact that the closed eye area moves continuously with time due to the effect of the sunlight, and for face size, for example, it is possible to use information such as the fact that there is a tendency for children who have small faces to come to a store after school on weekdays in estimation.

In addition, the eye state maps, face size maps and facial brightness maps may be used by being created at the same time every day, or may be used by being created for each season. In addition, in case that it is possible to control the illumination state, it is possible to improve the environment of the monitoring area by controlling the illumination state.

In addition, as a result of the various map display screen generation unit 5 that generates display information for displaying the eye state maps, the face size maps, and the facial brightness maps, it is possible for a user to recognize positions in which there is a concern that the precision of facial collation will deteriorate, and therefore, it is possible to further improve precision by adding minute adjustments based on such information. In addition, it is possible to check which position is a final monitoring position using the display information that is generated by the optimum monitoring position display screen generation unit 4, and it is possible for a user to improve a monitoring environment of that position by removing obstacles or the like that interrupts a line of sight.

When the optimum monitoring position of a person in the monitoring area 50 is determined, the camera setting change unit 35 changes the optimum monitoring position using the adjustment amount of the camera 2 that is estimated by the adjustment amount estimation unit 34. That is, the optimum monitoring position of a person in the monitoring area 50 is changed in accordance with the movement direction in the monitoring area 50 of the eye state map. For example, if eye state maps that are created at a certain time are set as the eye state maps that are shown in FIGS. 4 and 5, and eye state maps that are created at a certain time that is subsequent thereto are set as the eye state maps that are shown in FIGS. 6 and 7, the fact that cells with bad eye states move in a direction in which eye state maps at the time that is shown in FIGS. 4 and 5 become distant from the camera 2 is detected, and based on the movement speed of the cells, the camera 2 is adjusted so that an optimum monitoring area 70B moves toward an optimum monitoring area 70A. The reason for this is that an angle at which sunlight which is a cause of glare is incident, changes continuously with time.

Figure 9:
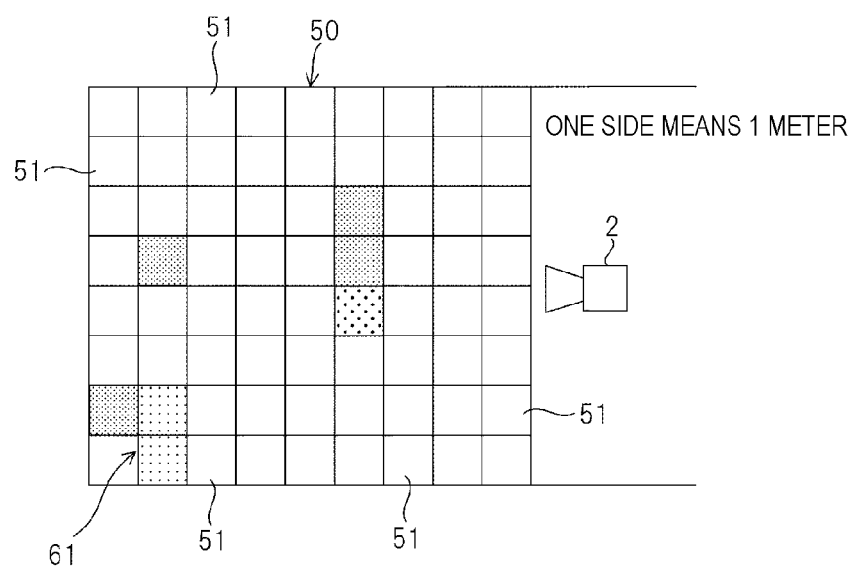
FIG. 9 is an example of display information that is generated by a various map display screen generation unit of the imaging position determination device in FIG. 1, and is a view from directly above.
Figure 10:
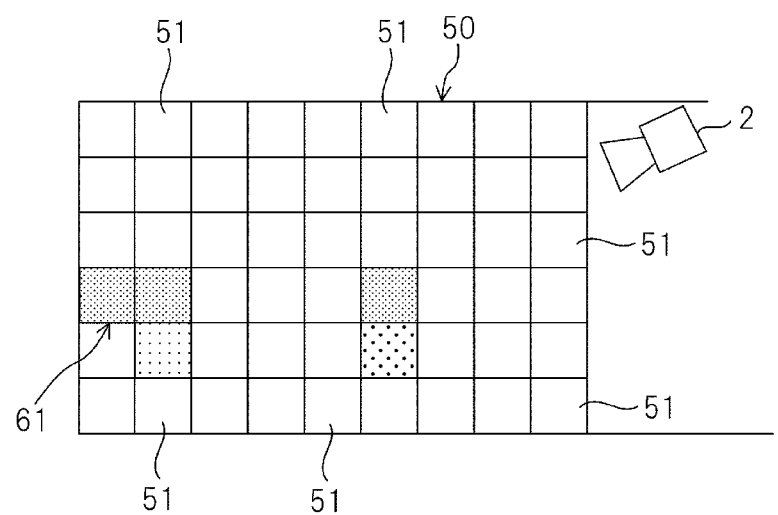
FIG. 10 is an example of display information that is generated by the various map display screen generation unit of the imaging position determination device in FIG. 1, and is a view from the side.

The various map display screen generation unit 5 generates display information for displaying according to a scale of real space. FIGS. 9 and 10 are examples of display information that is generated by the various map display screen generation unit 5, FIG. 9 is a view from directly above, and FIG. 10 is a view from the side. Since the display information that is generated by the various map display screen generation unit 5 is displayed on the display unit 8, a user can intuitively know a specific area with deteriorated facial states as a result of looking at the eye state maps. For example, as shown in FIG. 9, if there is a deterioration area 61 on a distant left side when viewed from the camera 2, and the cause of this is the influence of external light from the outside of the store, it is possible to take measures to improve the situation by closing blinds, changing the orientation of a mirror or the like, and therefore, it is possible to further improve the monitoring environment.

Figure 11:
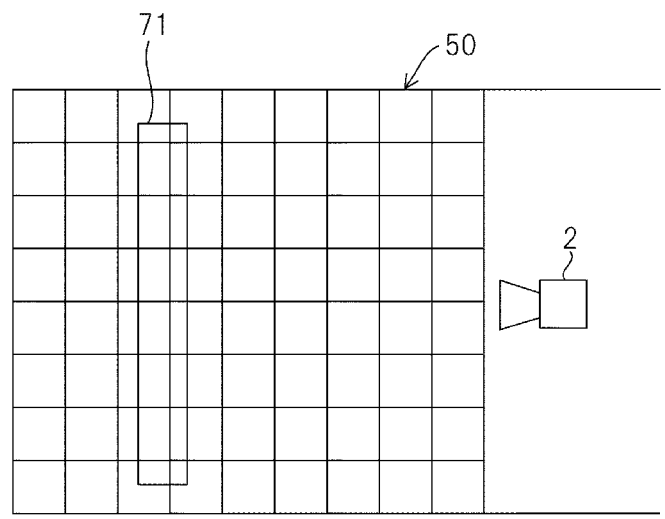
FIG. 11 is an example of display information that is generated by an optimum monitoring position display screen generation unit of the imaging position determination device in FIG. 1, and is a view from directly above.
Figure 12:
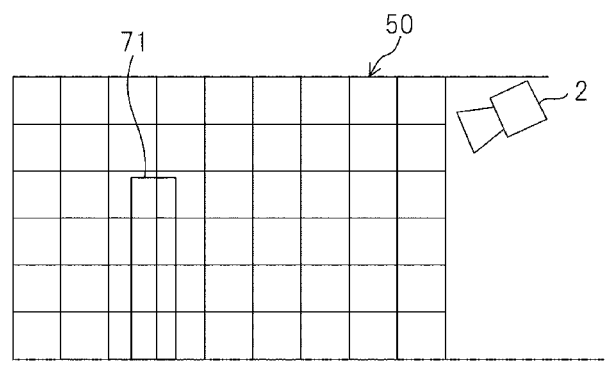
FIG. 12 is an example of display information that is generated by an optimum monitoring position display screen generation unit of the imaging position determination device in FIG. 1, and is a view from the side.

The optimum monitoring position display screen generation unit 4 generates display information for displaying an optimum monitoring position for the facial detection in the current situation. FIGS. 11 and 12 are examples of display information that is generated by the optimum monitoring position display screen generation unit 4, FIG. 11 is a view from directly above, and FIG. 12 is a view from the side. Since the display information for displaying the optimum monitoring position 71 is displayed on the display unit 8, a user can be careful not to dispose an obstacle which interrupts a line of sight in a displayed position or dispose equipment or the like in a manner in which passersby are likely to pass through the position as a result of looking at the display, and it is possible to further improve the monitoring environment.

Figure 13:
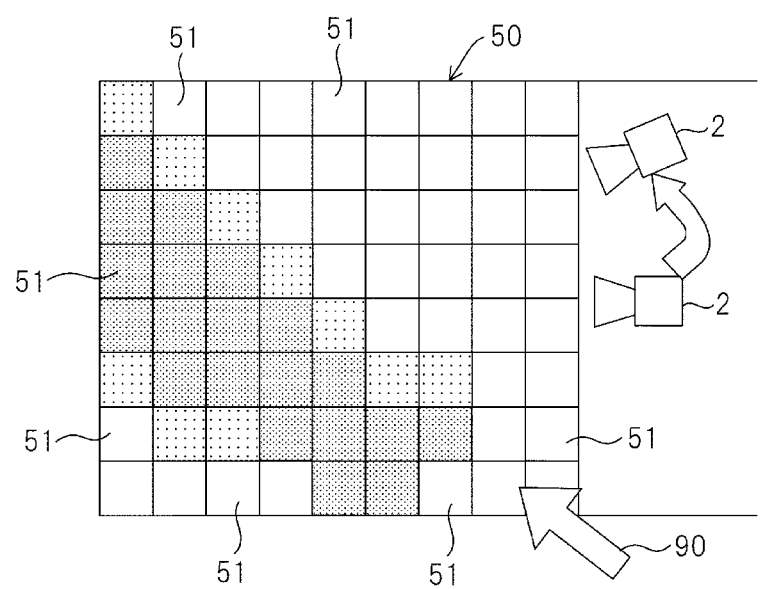
FIG. 13 is an example of display information that is generated by an optimum camera installation position display screen generation unit of the imaging position determination device in FIG. 1, and is a view before camera monitoring position adjustment.
Figure 14:
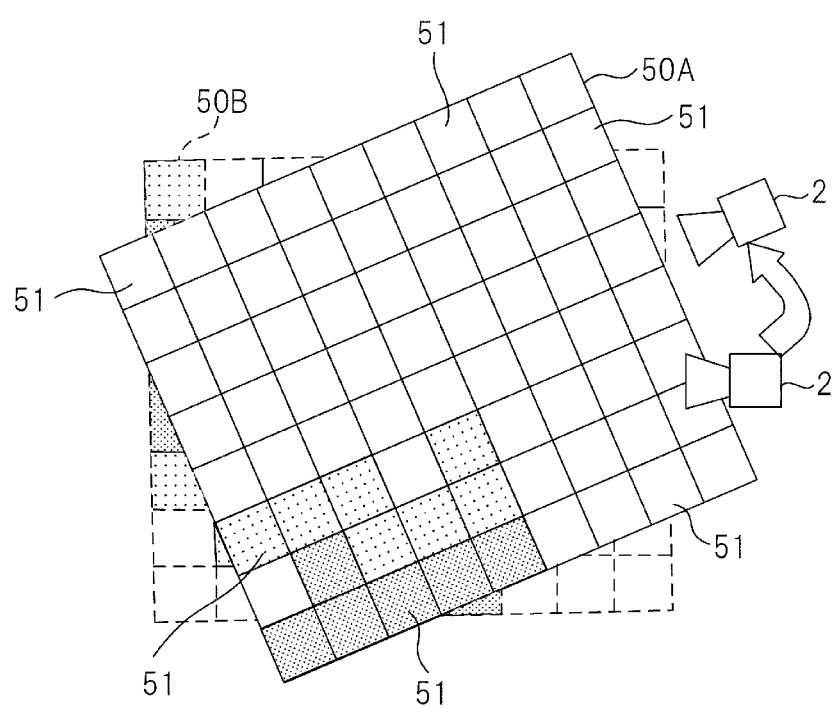
FIG. 14 is an example of display information that is generated by a optimum camera installation position display screen generation unit of the imaging position determination device in FIG. 1, and is a view after camera monitoring position adjustment.

The optimum camera installation position display screen generation unit 6 generates display information for displaying an optimum three-dimensional position in setting of the camera 2. FIGS. 13 and 14 are examples of display information that is generated by the optimum camera installation position display screen generation unit 6, FIG. 13 is a view before camera monitoring position adjustment, and FIG. 14 is a view after camera monitoring position adjustment. Since the display information that is generated by the optimum camera installation position display screen generation unit 6 is displayed on the display unit 8, a user can know a position for installation of the camera 2 in which optimum monitoring is possible as a result of looking at the display. For example, in case that the eye state map is in a state as shown in FIG. 13, it is possible to assume from the distribution status of the eye state map, that there is a cause for the eye state deteriorating toward the upper left from the lower right in the figure as shown by an arrow 90. For example, a breeze from an air conditioning apparatus blows directly in that region or the like. In such a case, the adjustment amount of the optimum monitoring position of the camera 2 is estimated by the adjustment amount estimation unit 34 as shown in the figure. Further, since the estimated adjustment amount display screen generation unit 7 generates display information based on the estimated value, a user performs change of the optimum monitoring position of the camera 2 while looking at the display. As a result of this, as shown in FIG. 14, environmental improvement of the monitoring area 50 is possible. In this case, the monitoring area before adjustment is represented by 50B (B: Before) and the monitoring area after adjustment is represented by 50A (A: After).

Since the imaging position determination device 1 according to the present embodiment includes the image receiving unit 30 which acquires an image and a position of a person in the monitoring area 50, the eye state detection unit 323 which detects an open and closed state of the eyes of the person from the image that is acquired by the image receiving unit 30, the eye state map generation unit 331 which creates the eye state map that shows the eye state of the person in the monitoring area 50 from the open and closed state of the eyes of the person which is acquired by the eye state detection unit 323, and the adjustment amount estimation unit 34 which determines the imaging position of the person in the monitoring area 50 using the eye state map that is created by the eye state map generation unit 331, it is possible to perform camera adjustment according to the eye state of the person, and as a result of this, the acquisition of face images with closed eyes is reduced, and an improvement in facial collation precision is achieved.

Figure 15:
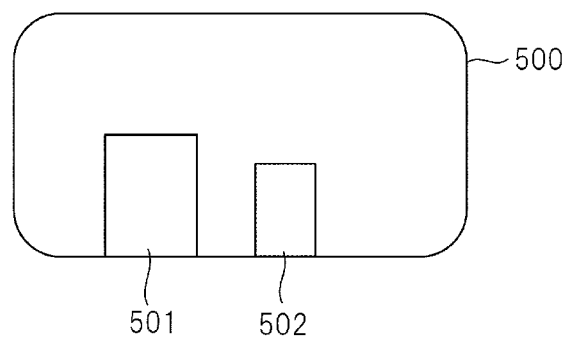
FIG. 15 is a view that shows an example of a two-dimensional image that can be observed through a camera of the imaging position determination device in FIG. 1.

Additionally, the imaging position determination device 1 according to the present embodiment is configured to require a three-dimensional position when generating the eye state map, but since a three-dimensional position is not necessary if merely monitoring, a two-dimensional position that can be observed through the camera 2 may also be used. FIG. 15 is a view that shows an example of a two-dimensional image that can be observed through the camera 2. In the figure, 500 is an angle of view of the camera 2, and 501 and 502 are respectively image acquisition regions (regions that correspond to imaging positions in an image that is captured by the camera 2).

(Overview of an Aspect of Present Disclosure)

The imaging position determination device of the present disclosure includes an input unit that acquires an image and a position of a person within a monitoring area, a state extraction unit that extracts a state of the person from the image acquired by the input unit, a state map creation unit that creates a state map which shows a state of the person in the monitoring area from the position of the person and the state of the person, and a position determination unit that determines an imaging position of the person in the monitoring area using the state map.

According to the abovementioned configuration, it is possible to determine the imaging position according to the position of a person and the state of the person.

In the abovementioned configuration, the state map creation unit creates the state map for each period of time.

According to the abovementioned configuration, it is possible to determine the imaging position according to the period of time.

In the abovementioned configuration, the imaging position determination device controls an illumination state of the monitoring area based on the state map.

According to the abovementioned configuration, it is possible to improve the environment of the monitoring area.

In the abovementioned configuration, the state of the person is an open and closed state of eyes of the person.

According to the abovementioned configuration, it is possible to reduce the acquisition of faces with closed eyes.

In the abovementioned configuration, the state map is created multiple times in a predetermined period of time, and the imaging position of the person in the monitoring area is changed in accordance with a movement direction in the monitoring area of the state maps.

According to the abovementioned configuration, for example, even if the angle at which sunlight is incident changes continuously with time, since it is possible to change the imaging position so that the change in the angle does not have an effect, it is possible to reduce the acquisition of faces with closed eyes.

In the abovementioned configuration, a position of an obstacle in the monitoring area is estimated based on the state map.

According to the abovementioned configuration, it is possible to remove obstacles that cause hindrances in monitoring, and therefore, an improvement in the monitoring environment is achieved.

The imaging position determination device further includes an imaging unit that acquires a monitoring image by capturing an image of the monitoring area, in which the imaging unit determines an image acquisition region corresponding to the determined imaging position in the monitoring image based on the determined imaging position in the monitoring area.

According to the abovementioned configuration, it is possible to determine the imaging position according to the state of a person, and therefore, an improvement in facial collation precision is achieved.

In the abovementioned configuration, the imaging unit is controlled based on the determined imaging position.

According to the abovementioned configuration, it is possible to reliably capture an image of a person in the monitoring area.

The imaging position determination device further includes a display screen generation unit that generates display information for displaying the state map.

According to the abovementioned configuration, it is possible to confirm a created state map by sight.

The imaging position determination method of the present disclosure includes an input step of acquiring an image and a position of a person within a monitoring area, a state extraction step of extracting a state of the person from the image acquired in the input step, a state map creation step of creating a state map which shows a state of the person in the monitoring area based on the position of the person and the state of the person, and a position determination step of determining an imaging position of the person in the monitoring area based on the state map.

According to the abovementioned method, it is possible to determine the imaging position according to the position of a person and the state of the person.

In the abovementioned method, a state map is created for each period of time in the state map creation step.

According to the abovementioned method, it is possible to determine the imaging position according to the period of time.

In the abovementioned method, an illumination state of the monitoring area is controlled based on the state map.

According to the abovementioned method, it is possible to improve the environment of the monitoring area.

In the abovementioned method, the state of the person is an open and closed state of eyes of the person.

According to the abovementioned method, it is possible to reduce the acquisition of faces with closed eyes.

In the abovementioned method, the state map is created multiple times in a predetermined period of time, and the imaging position of the person in the monitoring area is changed in accordance with a movement direction in the monitoring area of the state maps.

According to the abovementioned method, for example, even if the angle at which sunlight is incident changes continuously with time, since it is possible to change the imaging position so that the change in the angle does not have an effect, it is possible to reduce the acquisition of faces with closed eyes.

In the abovementioned method, a position of an obstacle in the monitoring area is estimated based on the state map.

According to the abovementioned method, it is possible to remove obstacles that cause hindrances in monitoring, and therefore, an improvement in the monitoring environment is achieved.

The imaging position determination method further includes an imaging step of acquiring a monitoring image by capturing an image of the monitoring area, in which, in the imaging step, an image acquisition region corresponding to the determined imaging position in the monitoring image based on the determined imaging position in the monitoring area.

According to the abovementioned method, it is possible to determine the imaging position according to the state of a person, and therefore, an improvement in facial collation precision is achieved.

In the abovementioned method, the imaging step is controlled based on the determined imaging position.

According to the abovementioned method, it is possible to reliably capture an image of a person in the monitoring area.

The imaging position determination method further includes a display screen generation step of generating display information for displaying the state map.

According to the abovementioned method, it is possible to confirm a created state map by sight.

The present disclosure has been described in detail and with reference to specific embodiments, but the fact that it is possible to add various modifications and revisions without departing from the spirit and scope of the present disclosure would be apparent to a person skilled in the art.

The present application is based on Japanese patent application filed on Jun. 18, 2013 (Japanese Patent Application No. 2013-127594), the contents of which are incorporated herein by reference.

INDUSTRIAL APPLICABILITY

The present disclosure is related to an imaging position determination device and an imaging position determination method, which perform image processing that performs facial collation using a captured image, in which the imaging position determination device and the imaging position determination method are capable of performing camera adjustment according to circumstances and are capable of reducing the acquisition of faces with closed eyes, and can be applied in a monitoring camera system.

REFERENCE SIGNS LIST

1 IMAGING POSITION DETERMINATION DEVICE
2 CAMERA
3 IMAGE PROCESSING DEVICE
4 OPTIMUM MONITORING POSITION DISPLAY SCREEN GENERATION UNIT
5 VARIOUS MAP DISPLAY SCREEN GENERATION UNIT
6 OPTIMUM CAMERA INSTALLATION POSITION DISPLAY SCREEN GENERATION UNIT
7 ESTIMATED ADJUSTMENT AMOUNT DISPLAY SCREEN GENERATION UNIT
8 DISPLAY UNIT
30 IMAGE RECEPTION UNIT
31 FACE DETECTION UNIT
32 SUITABLE FACIAL IMAGE DETERMINATION UNIT
33 FACIAL STATE MAP GENERATION UNIT
34 ADJUSTMENT AMOUNT ESTIMATION UNIT
35 CAMERA SETTING CHANGE UNIT
50 MONITORING AREA
51 CELL
100 PERSON
321 FACE SIZE DETERMINATION UNIT
322 FACE LUMINANCE DETERMINATION UNIT
323 EYE STATE DETECTION UNIT
331 EYE STATE MAP GENERATION UNIT
332 FACE SIZE MAP GENERATION UNIT
333 FACIAL BRIGHTNESS MAP GENERATION UNIT

The invention claimed is:

1. An imaging position determination device comprising:
a processor that performs operations comprising:
acquiring an image and a position of a person within a monitoring area;

counting a closed eye state of the person from the image;
creating a state map which shows a state of the person in the monitoring area based on the position of the person and an amount of the closed eye state of the person;
determining an imaging position of the person in the monitoring area based on the state map; and
outputting an adjustment amount to cause adjustment of a camera, the adjustment amount determined based on the imaging position, to a camera which obtained the image.

2. The imaging position determination device according to claim 1,
wherein the state map is created for each period of time.

3. The imaging position determination device according to claim 1,
wherein an illumination state of the monitoring area is controlled based on the state map.

4. The imaging position determination device according to claim 1,
wherein the state map is created multiple times in a predetermined period of time, and the imaging position of the person in the monitoring area is changed in accordance with a movement direction in the monitoring area of each state map.

5. The imaging position determination device according to claim 1,
wherein a position of an obstacle in the monitoring area is estimated based on the state map.

6. The imaging position determination device according to claim 1, further comprising:
acquiring a monitoring image by capturing an image of the monitoring area,
wherein the acquiring determines an image acquisition region corresponding to the determined imaging position in the monitoring image based on the determined imaging position in the monitoring area.

7. The imaging position determination device according to claim 6,
wherein the acquiring is controlled based on the determined imaging position.

8. The imaging position determination device according to claim 1, further comprising:
generating display information for displaying the state map.

9. An imaging position determination method comprising:
of acquiring an image and a position of a person within a monitoring area;
counting a closed eye state of the person from the acquired image;
creating a state map which shows a state of the person in the monitoring area based on the position of the person and an amount of the closed eye state of the person;
determining an imaging position of the person in the monitoring area based on the state map; and
outputting an adjustment amount to cause adjustment of a camera, the adjustment amount determined based on the imaging position, to a camera that obtained the image.

10. The imaging position determination method according to claim 9,
wherein the creating creates state map is created for each period of time.

11. The imaging position determination method according to claim 9,
wherein an illumination state of the monitoring area is controlled based on the state map.

12. The imaging position determination method according to claim 9,
wherein the state map is created multiple times in a predetermined period of time, and the imaging position of the person in the monitoring area is changed in accordance with a movement direction in the monitoring area of each state map.

13. The imaging position determination method according to claim 9,
wherein a position of an obstacle in the monitoring area is estimated based on the state map.

14. The imaging position determination method according to claim 9, further comprising:
acquiring a monitoring image by capturing an image of the monitoring area,
wherein, the acquiring comprises determining, an image acquisition region corresponding to the determined imaging position in the monitoring image based on the determined imaging position in the monitoring area.

15. The imaging position determination method according to claim 14,
wherein the acquiring is controlled based on the determined imaging position.

16. The imaging position determination method according to claim 9, further comprising:
generating display information for displaying the state map.

* * * * *